US012603871B2

(12) United States Patent (10) Patent No.: US 12,603,871 B2
Willson et al. (45) Date of Patent: Apr. 14, 2026

(54) ACCESS ORCHESTRATION ENGINE IN A CLOUD ACCESS MANAGEMENT SYSTEM

(71) Applicant: Microsoft Technology Licensing, LLC, Redmond, WA (US)

(72) Inventors: Zachary Cole Willson, Redmond, WA (US); Prasanna Chromepet Padmanabhan, Redmond, WA (US); Gaurav Raghu Dhawan, Seattle, WA (US); Yizhong Wu, Shanghai (CN); Ivaylo Detelinov Ivanov, Redmond, WA (US); Purna Venkata S Bodapati, Bothell, WA (US); Suyin Liu, Suzhou (CN); Wensheng Xu, Suzhou (CN); Alexis Jade Lambert, Apopka, FL (US); William Lee Wayne Weston, Snoqualmie, WA (US); Somesh Goel, Newcastle, WA (US); Sandeep Patnaik, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 212 days.

(21) Appl. No.: 18/318,254

(22) Filed: May 16, 2023

(65) Prior Publication Data

US 2024/0388576 A1 Nov. 21, 2024

(51) Int. Cl.
*H04L 9/40* (2022.01)
(52) U.S. Cl.
CPC .................................... *H04L 63/08* (2013.01)
(58) Field of Classification Search
None
See application file for complete search history.

(56) References Cited

U.S. PATENT DOCUMENTS 10,057,273 B1 * 8/2018 Chakraborty ....... H04L 67/1044
10,616,224 B2 * 4/2020 Subramanian ........ H04L 67/146
(Continued)

OTHER PUBLICATIONS

"Identity Platform multi-tenancy", Retrieved from the URL: https://web.archive.org/web/20191217141430/https://cloud.google.com/identity-platform/docs/multi-tenancy, Dec. 17, 2019, 2 Pages.
(Continued)

*Primary Examiner* — Fatoumata Traore
(74) *Attorney, Agent, or Firm* — Shook, Hardy & Bacon L.L.P.

(57) ABSTRACT

Methods, systems, and computer storage media for providing cloud access management using an access orchestration engine in a cloud access management system. Cloud access management provides access to a remote client of a consumer-identity-supported tenant environment of an organization. In operation, a consumer identity of a user is accessed. The consumer identity is approved for access to the consumer-identity-supported tenant environment. Based on accessing the consumer identity, access orchestration operations are executed for the remote client using remote client access resources, organization resources, and consumer identity resources. Executing the access orchestration operations comprises provisioning the remote client with remote access services for consumer identities; provisioning the remote client with organization resources; and priming the remote client with the consumer identity resources upon determining that the consumer identity is associated with the consumer-identity-supported tenant environment. The remote client is deployed, and the remote client is accessible based on the consumer identity.

20 Claims, 11 Drawing Sheets

(56) References Cited

U.S. PATENT DOCUMENTS

| | | | |
|---|---|---|---|
| 12,238,102 B2 * | 2/2025 | Palanisamy | ............. H04L 67/50 |
| 2013/0254847 A1 | 9/2013 | Adams et al. | |
| 2014/0090037 A1 | 3/2014 | Singh | |
| 2016/0134619 A1 | 5/2016 | Mikheev | |
| 2020/0244664 A1 * | 7/2020 | Pate | ................... H04L 63/0807 |

OTHER PUBLICATIONS

International Search Report and Written Opinion received for PCT Application No. PCT/US2024/026710, Sep. 10, 2024, 15 pages.
International Preliminary Report on Patentability (Chapter I) received for PCT Application No. PCT/US2024/026710, Mailed on Nov. 27, 2025, 09 Pages.

* cited by examiner

100

CLOUD ACCESS MANAGEMENT SYSTEM
100A

ACCESS ORCHESTRATION ENGINE
110

REMOTE CLIENT
150

REMOTE CLIENT
152

NETWORK
100B

CLOUD ACCESS MANAGEMENT CLIENT
160

ACCESS ORCHESTRATION CLIENT
162

ORGANIZATION IDENTIFIER
164

CLOUD ACCESS MANAGEMENT CLIENT
170

ACCESS ORCHESTRATION CLIENT
172

100

CLOUD ACCESS MANAGEMENT SYSTEM
100A

ACCESS ORCHESTRATION ENGINE
110

INFRASTRUCTURE MANAGEMENT ENGINE
120

TENANT DIRECTORY ENGINE
130

CLOUD-BASED SERVICES ENGINE
140

REMOTE CLIENT
150

REMOTE CLIENT
152

NETWORK
100B

CLOUD ACCESS MANAGEMENT CLIENT
160

ACCESS ORCHESTRATION CLIENT
162

ORGANIZATION IDENTIFIER
164

CLOUD ACCESS MANAGEMENT CLIENT
170

ACCESS ORCHESTRATION CLIENT
172

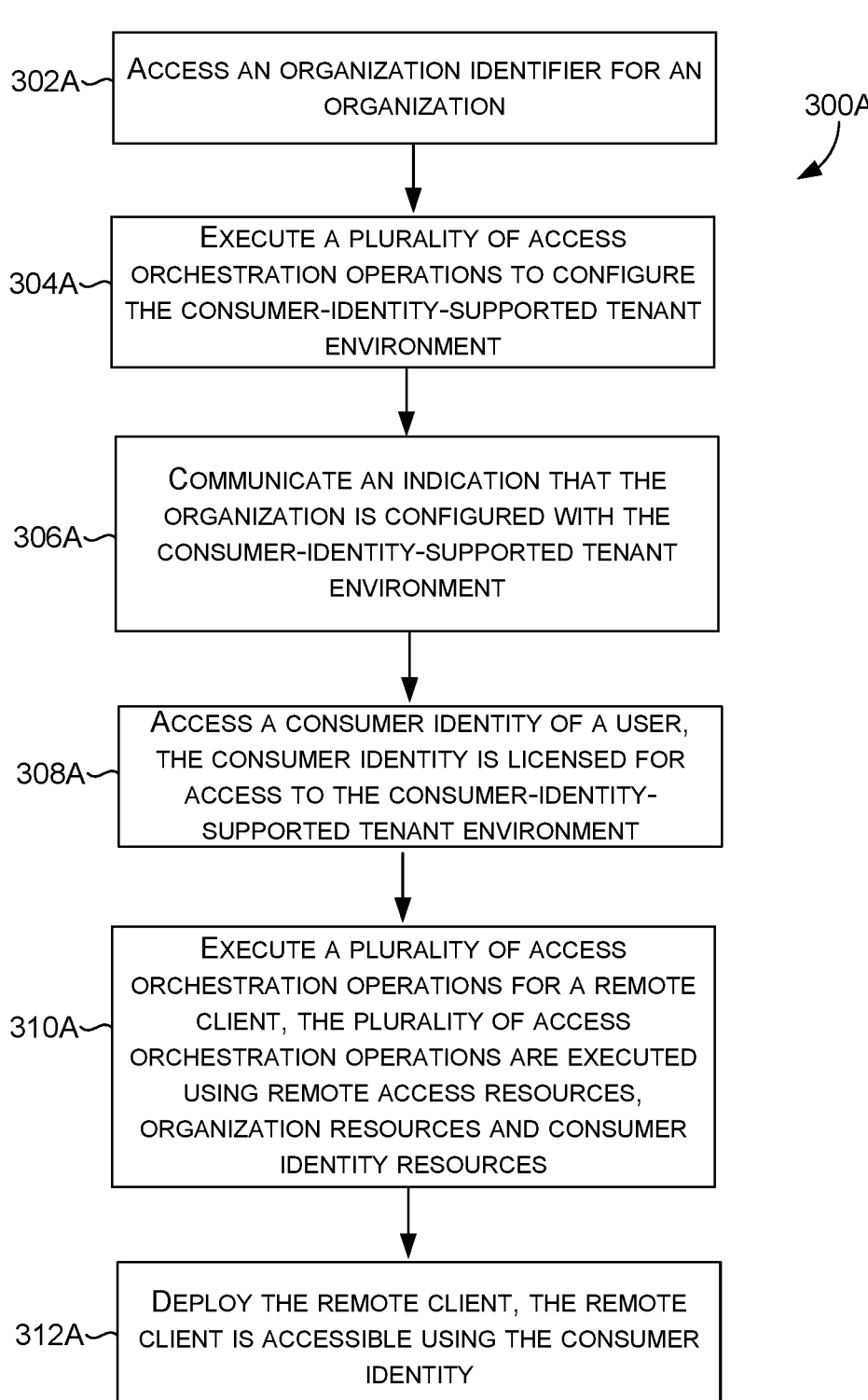

302A— ACCESS AN ORGANIZATION IDENTIFIER FOR AN ORGANIZATION

300A

304A— EXECUTE A PLURALITY OF ACCESS ORCHESTRATION OPERATIONS TO CONFIGURE THE CONSUMER-IDENTITY-SUPPORTED TENANT ENVIRONMENT

306A— COMMUNICATE AN INDICATION THAT THE ORGANIZATION IS CONFIGURED WITH THE CONSUMER-IDENTITY-SUPPORTED TENANT ENVIRONMENT

308A— ACCESS A CONSUMER IDENTITY OF A USER, THE CONSUMER IDENTITY IS LICENSED FOR ACCESS TO THE CONSUMER-IDENTITY-SUPPORTED TENANT ENVIRONMENT

310A— EXECUTE A PLURALITY OF ACCESS ORCHESTRATION OPERATIONS FOR A REMOTE CLIENT, THE PLURALITY OF ACCESS ORCHESTRATION OPERATIONS ARE EXECUTED USING REMOTE ACCESS RESOURCES, ORGANIZATION RESOURCES AND CONSUMER IDENTITY RESOURCES

312A— DEPLOY THE REMOTE CLIENT, THE REMOTE CLIENT IS ACCESSIBLE USING THE CONSUMER IDENTITY

FIG. 3A

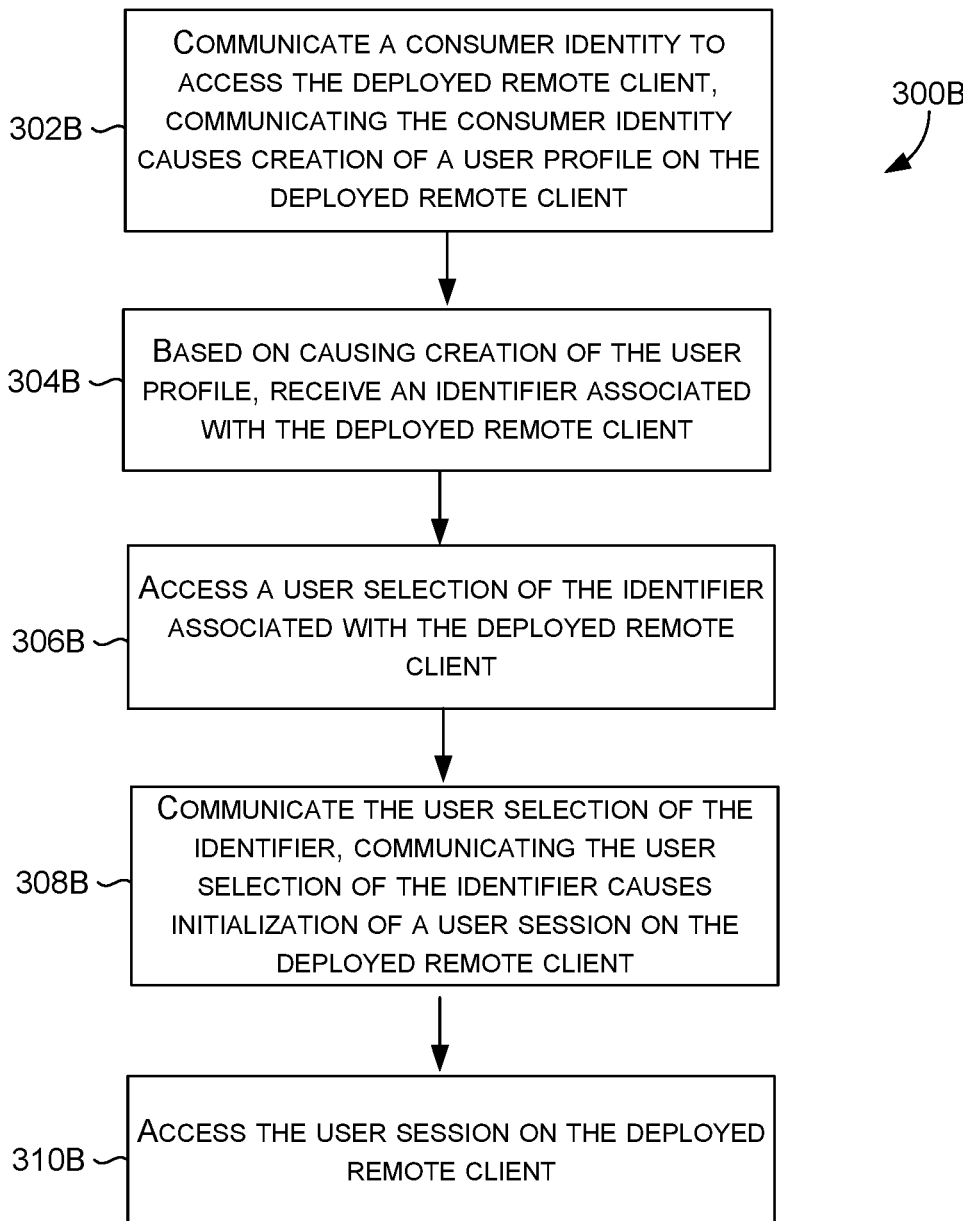

302B — COMMUNICATE A CONSUMER IDENTITY TO ACCESS THE DEPLOYED REMOTE CLIENT, COMMUNICATING THE CONSUMER IDENTITY CAUSES CREATION OF A USER PROFILE ON THE DEPLOYED REMOTE CLIENT

300B

304B — BASED ON CAUSING CREATION OF THE USER PROFILE, RECEIVE AN IDENTIFIER ASSOCIATED WITH THE DEPLOYED REMOTE CLIENT

306B — ACCESS A USER SELECTION OF THE IDENTIFIER ASSOCIATED WITH THE DEPLOYED REMOTE CLIENT

308B — COMMUNICATE THE USER SELECTION OF THE IDENTIFIER, COMMUNICATING THE USER SELECTION OF THE IDENTIFIER CAUSES INITIALIZATION OF A USER SESSION ON THE DEPLOYED REMOTE CLIENT

310B — ACCESS THE USER SESSION ON THE DEPLOYED REMOTE CLIENT

FIG. 3B

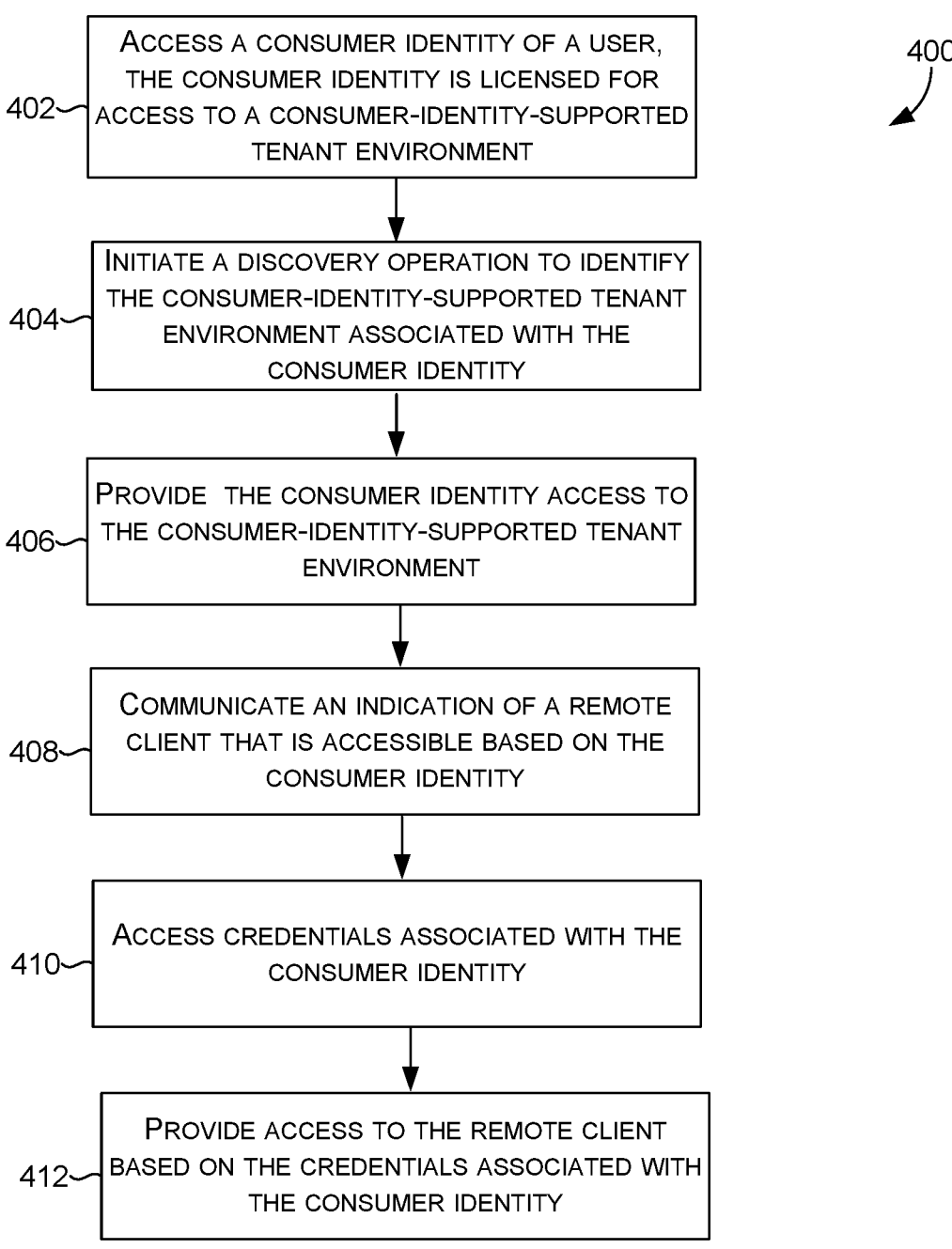

402 — ACCESS A CONSUMER IDENTITY OF A USER, THE CONSUMER IDENTITY IS LICENSED FOR ACCESS TO A CONSUMER-IDENTITY-SUPPORTED TENANT ENVIRONMENT

404 — INITIATE A DISCOVERY OPERATION TO IDENTIFY THE CONSUMER-IDENTITY-SUPPORTED TENANT ENVIRONMENT ASSOCIATED WITH THE CONSUMER IDENTITY

406 — PROVIDE THE CONSUMER IDENTITY ACCESS TO THE CONSUMER-IDENTITY-SUPPORTED TENANT ENVIRONMENT

408 — COMMUNICATE AN INDICATION OF A REMOTE CLIENT THAT IS ACCESSIBLE BASED ON THE CONSUMER IDENTITY

410 — ACCESS CREDENTIALS ASSOCIATED WITH THE CONSUMER IDENTITY

412 — PROVIDE ACCESS TO THE REMOTE CLIENT BASED ON THE CREDENTIALS ASSOCIATED WITH THE CONSUMER IDENTITY

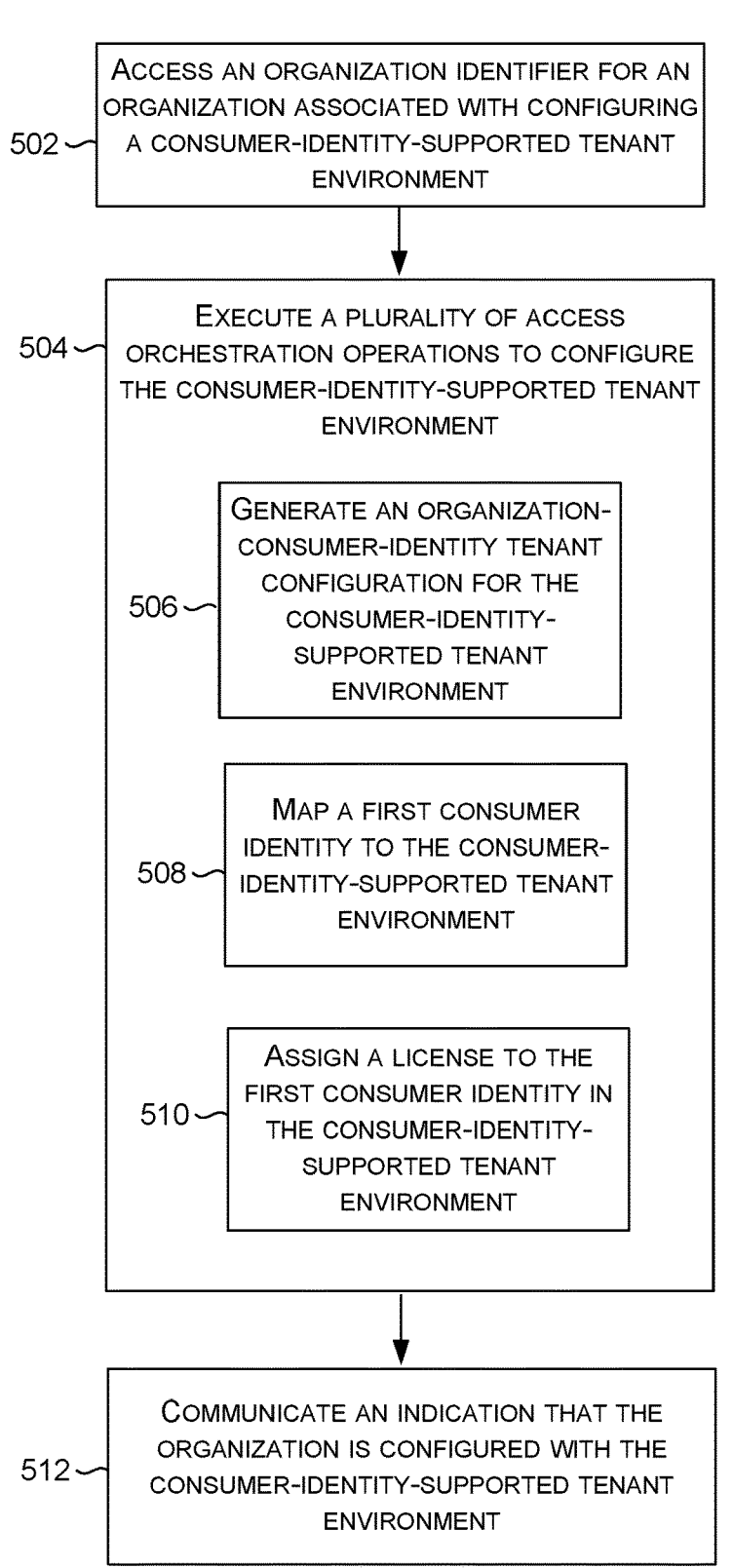

500

502 — ACCESS AN ORGANIZATION IDENTIFIER FOR AN ORGANIZATION ASSOCIATED WITH CONFIGURING A CONSUMER-IDENTITY-SUPPORTED TENANT ENVIRONMENT

504 — EXECUTE A PLURALITY OF ACCESS ORCHESTRATION OPERATIONS TO CONFIGURE THE CONSUMER-IDENTITY-SUPPORTED TENANT ENVIRONMENT

506 — GENERATE AN ORGANIZATION-CONSUMER-IDENTITY TENANT CONFIGURATION FOR THE CONSUMER-IDENTITY-SUPPORTED TENANT ENVIRONMENT

508 — MAP A FIRST CONSUMER IDENTITY TO THE CONSUMER-IDENTITY-SUPPORTED TENANT ENVIRONMENT

510 — ASSIGN A LICENSE TO THE FIRST CONSUMER IDENTITY IN THE CONSUMER-IDENTITY-SUPPORTED TENANT ENVIRONMENT

512 — COMMUNICATE AN INDICATION THAT THE ORGANIZATION IS CONFIGURED WITH THE CONSUMER-IDENTITY-SUPPORTED TENANT ENVIRONMENT

CLIENT DEVICE
680

FABRIC
CONTROLLER
640

HOST
650

VIRTUAL
MACHINE
652

VIRTUAL
MACHINE
654

NODE 630

RESOURCES
660

RACK 620

CLOUD COMPUTING PLATFORM 610

ACCESS ORCHESTRATION ENGINE IN A CLOUD ACCESS MANAGEMENT SYSTEM

BACKGROUND

Users rely on computing environments with applications and services to accomplish computing tasks. Distributed computing systems (or cloud computing platforms) host and support different types of applications and services in managed computing environments. In particular, a cloud computing platform can implement a cloud access management system that provides access management functionality for different types of cloud computing offerings. For example, a cloud access management system can support onboarding organizations for different types of cloud computing offerings-including managed desktop services that include virtual machines assigned to individual users as virtual desktop devices configured with productivity, security, and collaboration tools.

SUMMARY

Various aspects of the technology described herein are generally directed to systems, methods, and computer storage media for, among other things, providing cloud access management using an access orchestration engine. Cloud access management supports access orchestration operations that allow users to use a consumer identity (e.g., OUTLOOK, GMAIL, HOTMAIL, or phone number) to access an organization-owned remote computing device (e.g., a remote client).

The access orchestration engine operates based on an access orchestration workflow designed for consumer identities. By way of illustration, the access orchestration workflow includes access orchestration operations that support acquiring a license for a consumer to access a remote client of an organization, provisioning the remote client for a remote connection experience using the consumer identity, and connecting the user to the remote client using the consumer identity. For example, an organization can request that it be configured to provide users with access to remote clients based on their consumer identities. The request is granted using access orchestration operations that configure a consumer-identity-supported tenant environment for the organization and provision remote clients for remote access using remote client resources, organization resources, and consumer identity resources. As such, users—via credentials of their consumer identities—can access both organization resources and consumer identity resources on remote clients.

Conventionally, cloud access management systems are not configured with comprehensive computing logic and infrastructure to effectively provide consumer-identity-based access to remote clients. For example, access to managed computing environments (e.g., remote clients) for organizations is limited to organization identities-without support for consumer identities-because the cloud access management system lacks integration with access orchestration operations for consumer identities. Organizations and cloud computing providers have to manage computing resources (e.g., an organization domain and organization identities for employees) associated with an onboarding process for providing users access to remote clients of the organization. For example, the organization provides domain information which is integrated into a tenant directory (e.g., AZURE ACTIVE DIRECTORY) of a cloud computing provider, so their employees have access to remote clients associated with the organization. Moreover, without adequate support of consumer identities for access to organization resources, a cloud computing provider inefficiently utilizes compute and storage resources in the cloud computing system to manage two identities—an organization identity and a consumer identity—for the same user.

A technical solution—to the limitations of conventional cloud access management systems—can include providing access orchestration operations and interfaces via an access orchestration engine that supports cloud access management in a cloud access management system. Access orchestration operations can include configuring a consumer-identity-supported tenant environment; pre-configuring remote client access resources, organization resources and consumer identity resources on a remote client; and providing access to the remote client using a consumer identity. As such, the cloud access management system can be improved based on access orchestration operations that operate to address a consumer identity access problem—by implementing a solution specific to the cloud computing environment, where the solution is different from operations of conventional cloud access management systems.

In operation, an organization identifier for an organization is accessed. The organization identifier is associated with a request to configure an organization for a consumer-identity-supported tenant environment that provides access to remote clients of the organization based on consumer identities. Based on a plurality of access orchestration operations, the consumer-identity-supported tenant environment is configured for the organization. The access orchestration operations include generating a consumer-identity-supported tenant configuration that initializes the consumer-identity-supported tenant environment for the organization; mapping a first consumer identity for a first user to the consumer-identity-supported tenant environment; and assigning a license to the first consumer identity in the consumer-identity-supported tenant environment for access to a first remote client. An indication that the organization is configured with the consumer-identity-supported tenant environment is communicated. For example, the indication is communicated to the first user (e.g., an administrator) who requested that the organization be configured for the consumer-identity-supported tenant environment.

Additionally, a second user (e.g., an employee of the organization) can receive an invitation to access a second remote client associated with the consumer-identity-supported tenant environment. The second user can review terms associated with accessing the second remote client and consent via acceptance of the invitation. The second user can communicate a second consumer identity to configure access to the second remote client, and the second consumer identity is licensed for access to the consumer-identity-supported tenant environment and the second remote client.

Access orchestration operations can further include listening for licenses assigned to consumer identities of users (e.g., the first consumer identity or the second consumer identity). A consumer identity of a user is then accessed. The consumer identity is approved for access to a remote client of the consumer-identity-supported tenant environment. Based on accessing the consumer identity, additional access orchestration operations are executed for the remote client based on remote client access resources, organization resources, and consumer identity resources. Executing the access orchestration operations comprises: provisioning the remote client with remote access services for consumer identities; provisioning the remote client with organization resources; and priming the remote client with the consumer identity resources upon determining that the consumer identity is associated with the consumer-identity-supported tenant environment. The remote client is marked as provisioned or deployed, where the remote client is accessible based on the consumer identity.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein:

FIGS. 3A and 3B provide a first exemplary method of providing cloud access management using an access orchestration engine, in accordance with aspects of the technology described herein;

FIG. 4 provides a second exemplary method of providing cloud access management using an access orchestration engine, in accordance with aspects of the technology described herein;

FIG. 5 provides a third exemplary method of providing cloud access management using an access orchestration engine, in accordance with aspects of the technology described herein;

DETAILED DESCRIPTION OF THE TECHNICAL SOLUTION

Overview

Figure 1A:
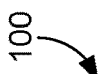
FIGS. 1A and 1B are block diagrams of an exemplary cloud access management system including an access orchestration engine, in accordance with aspects of the technology described herein.

The present cloud access management system supports identities and access management in the cloud. The cloud access management system can give both onsite and remote employees seamless access to their organization's resources, enable secure and seamless access to applications, and protect and govern access. For example, the cloud access management system can efficiently manage identities by ensuring the right people have the right access to the right resources. The cloud access management system can further support access to different types of cloud offerings. For example, a cloud access management system can support onboarding organizations for different types of cloud computing offerings-including managed desktop services that include virtual machines assigned to individual users as virtual desktop devices configured with productivity, security, and collaboration tools.

Conventionally, cloud access management systems are not configured with comprehensive computing logic and infrastructure to effectively provide consumer-identity-based access to remote clients. Such cloud access management systems may lack integration of consumer identities into cloud access management operations of a cloud computing platform. In particular, conventional cloud access management systems do not provide support for access to remote clients using consumer identities. For example, an organization would provide onboarding information (e.g., organization domain information, organization identities for employees) such that the organization is configured with domain-based tenant environment, which is accessible by their employees using their organization identities. The current onboarding process can be deficient in that some organizations may not need or may not be able to support the computing overhead associated with maintaining an organization domain and organization identities. The user experience is also deficient as users have to manage multiple identities; and while logged in with either their organization identity or their consumer identity, users are without access to resources associated with the other identity.

Moreover, merely providing remote clients for large organizations with domains and directory services—without access orchestration operations for consumer identities—causes deficient functioning of the computing systems. Management of domain and directory services—for some organizations—includes compute-intensive operations during and after the onboarding of users for access to remote clients. As such, a more comprehensive cloud access management system—with an alternative basis for performing cloud access management operations—can improve computing operations and interfaces in cloud access management systems.

Embodiments of the present technical solution are directed to systems, methods, and computer storage media for, among other things, providing cloud access management using an access orchestration engine. Cloud access management supports access orchestration operations that allow users to use an existing consumer identity to access an organization-owned remote computing device (e.g., remote client). Cloud access management is provided using the access orchestration engine that is operationally integrated into the cloud access management system. The cloud access management system supports an access orchestration framework of computing components associated with a novel approach for orchestrating operations at a portal and configuring remote connection services, where the remote client is owned or controlled by the organization, but the connecting user is using a consumer identity. The portal may be a login page, a web page, or interface where users can enter their credentials, such as username and password, to gain access to the cloud computing system, where the remote connection services allow users to access and control remote clients.

The access orchestration engine operates based on an access orchestration workflow designed for consumer identities. By way of illustration, the access orchestration workflow includes access orchestration operations that support acquiring a license for a consumer to access a remote client of an organization, provisioning the remote client for a remote connection experience using the consumer identity, and connecting the user to the remote client using the consumer identity. For example, an organization can request that it be configured to provide users with access to remote clients based on their consumer identities. The request is granted using access orchestration operations that configure a consumer-identity-supported tenant environment for the organization and provision remote clients for remote access using remote client resources, organization resources, and consumer identity resources. As such, users—via credentials of their consumer identities—can access both organization resources and consumer identity resources on remote clients.

At a high level, the cloud access management system supports access orchestration operations that allow users to use a consumer identity to access a remote client of a consumer-identity-supported tenant environment. By way of context, a consumer identity may be an account or profile having credentials (e.g., username and password, time-based one time password, number-matching, notifications, biometrics, multi-factor authentication) that are used to provide access to computing resources. It is contemplated that the consumer identity can be associated with different types of authentication mechanism that support verifying the identity of users to ensure only authorized user gain access to protected resources. The consumer identity can be assigned an account or profile of a cloud computing provider platform that supports different cloud computing offerings.

The consumer identity can be associated with one or more identity providers (e.g., external identity provider and/or internal identity provider) for authentication and may be associated with an email service. The consumer identity may be an existing consumer identity or may be created in real-time. The consumer identity can be associated with consumer identity resources (e.g., personal user resources, cloud storage, email, applications and services) that are accessible via a computing environment (e.g., remote client workspace or virtual machine workspace). In one example, a user can use their consumer identity (e.g., OUTLOOK, GMAIL, HOTMAIL, or phone number) to sign up for an account (e.g., MICROSOFT account) associated with the cloud computing provider. The account can be password-less (e.g., uses a multi-factor authentication). The consumer identity associated with the account can be used to access the remote client of an organization-owned remote computing device.

An organization may be a customer of a cloud computing platform. The organization can be provided cloud computing platform services including access, management, and development of applications and services. The organization may be a business with employees that need access to organization resources (e.g., applications) via a remote client. The organization may specifically want a cloud computing offering (e.g., consumer-identity-supported tenant environment) that allows users access to a remote client using the users' consumer identities—not organization identities provided by the organization.

A consumer-identity-supported tenant environment ("CIS tenant environment") can be a cloud computing offering that is a managed environment for an organization, where access to remote clients is available using consumer identities. The CIS tenant environment is generated based on consumer-identity-supported tenant configuration that removes domain requirements for an organization when configuring the CIS tenant environment. By way of example, the CIS tenant configuration can indicate that the requested tenant environment should be configured as a shadow tenant environment, such that, an organization domain and organization identities are not required for configuring the CIS tenant environment. The CIS tenant configuration can support generating a shadow tenant environment that includes a subset of features of a cloud computing provider offering, where the subset of features do not have domain requirements to be operational. In an example, the shadow tenant environment can support organization applications but not an email or storage services. In this way, the CIS tenant as a shadow tenant environment operates with consumer identities.

The CIS tenant environment is configured to support access orchestration operations that allow a consumer identity to access remote clients of the CIS tenant environment. For example, the CIS tenant supports a direct mapping of consumer identities to the CIS tenant environment that authorizes the mapped consumer identities for access to a portal and different types of remote connection services of remote clients associated with CIS tenant environment. The CIS tenant environment (e.g., via a tenant directory) can also support discovery of mappings of consumer identities to the CIS environment, when discovering whether a consumer identity is associated with the CIS tenant environment. For example, the CIS tenant may be associated with a property stored in the tenant directory that identifies a plurality of consumer identities that are mapped to the CIS tenant environment.

The cloud access management system provides a novel access orchestration workflow for an organization and users to enable accessing remote clients—via a CIS tenant environment—using consumer identities. By way of illustration, an organization (e.g., an administrator or user) may request a license for a tenant environment that supports accessing remote client based on consumer identities. The request can be processed—using different cloud computing platform devices and services—as a request for a consumer-identity-supported tenant environment. A tenant directory can be used to create the CIS tenant environment and further map a consumer identity to the CIS tenant environment. Based on generating the CIS tenant environment that maps to a consumer identity, the consumer identity is granted a license to access a remote client in the CIS tenant environment.

The CIS tenant environment can support invitations that are communicated to additional users to access remote clients via the CIS tenant environment. An invited user can be one of two user types: a first user type who already has a consumer identity (e.g., @outlook or @hotmail) that is associated with the cloud computing provider (e.g., MICROSOFT); or a second user type who has a consumer identity (e.g., @yahoo or @gmail) and can sign up for an account with the cloud computing provider. Invited users—using their consumer identities that are associated with the cloud computing provider of the CIS tenant environment—can accept the invitations, such that, their consumer identities are also mapped to the CIS tenant environment. In this way, a consumer identity that is associated with an account of the cloud computing provider is used to access the remote client.

A cloud-based service is responsible for processing the consumer identities and configuring remote clients, such that users can use their consumer identities to access remote clients. In particular, the cloud-based service listens for license assignments to consumer identities. The cloud-based service provisions a remote client with remote client access resources, organization resources, and consumer identity resources. The cloud-based service also confirms that consumer identity is mapped to the CIS tenant environment, which can specifically be used as a trigger to prime the remote client with the consumer identity and consumer identity resources. In this way, a user can access both their organization resources and consumer identity resources from the remote client. The cloud-based service deploys the remote client that is accessible using a consumer identity. The remote client can be accessed using different remote access services associated with the remote client.

From a user perspective, a user may use their consumer identity to access a remote client by signing into a login interface for the cloud computing provider—with their consumer identity credentials. The user signing in can trigger a discovery operation associated with their consumer identity, where the discovery operation determines whether the consumer identity is mapped to a CIS tenant environment. Based on determining that the consumer identity is associated with the CIS tenant environment, the user can be signed into the CIS tenant environment. The user may then be redirected to a CIS tenant portal that identifies a remote client that the user has access to, such that, the user makes a selection of a remote client. The user can be authenticated for the remote client and provided access to the remote client that is provisioned with remote client access resources, organization resources, and consumer identity resources. As such, the cloud access management system can support access orchestration operations that allow users to use a consumer identity to access a remote client of a CIS tenant environment.

Figure 1B:
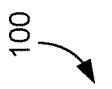

Aspects of the technical solution can be described by way of examples and with reference to FIGS. 1A-1B. FIG. 1A illustrates a cloud computing environment (system) 100 and cloud access management system 100A. The cloud access management system 100A includes network 110B, access orchestration engine 110, remote client 150, remote client 152, cloud access management client 160 with access orchestration client 162 and organization identifier 164, and client access management client 170 with access orchestration client 172.

The cloud computing environment 100 provides computing system resources for different types of managed computing environments. For example, the cloud computing platform supports delivery of computing services-including compute, servers, storage, databases, networking, and intelligence. A plurality of cloud access management clients (e.g., cloud access management client 160 and cloud access management client 170) include hardware or software that access resources in the cloud computing environment 100. Cloud access management client 160 and cloud access management client 170 can each include an application that supports client-side functionality associated with cloud computing environment. For example, cloud access management client 160 may represent an organization client requesting configuration of a tenant and cloud access management client 170 may represent a user client accessing a remote client, as discussed herein. The plurality of cloud access management clients can access computing components of the cloud computing environment 100 via a network (e.g., network 100B) to perform computing operations.

The cloud access management system 100A is designed to provide access management using the access orchestration engine 110. The cloud access management system 100A provides an integrated operating environment based on an access orchestration framework of computing components associated with providing consumer-identity-based access to remote client. The access orchestration engine 110 is responsible for access orchestration operations that support acquiring a license for a consumer to access a remote client (e.g., remote client 150) of an organization, provisioning the remote client 150 for a remote connection services using the consumer identity, and connecting the user to the remote client 150 using the consumer identity.

A remote client (e.g., remote client 150) is responsible for supporting provisioning operations for providing consumer-identity-based access to the remote client. The remote client 150 accesses remote client resources and initializes remote client provisioning including applying remote client access resources and organization resources to the remote client 150; and priming the remote client 150 with consumer identity resources of consumer identity. The remote client 150 may be a virtual machine that is configured based on remote client access resources, organization resources, and consumer identity resources and made accessible via a consumer identity. Remote client 152 operates similarly to remote client 150; however, remote client 150 can be provisioned and assigned to a first user (e.g., administrator) and remote client 152 can be provisioned and assigned to a second user (e.g., employee). Remote client 150 can be configured after a request that the organization be configured for consumer-identity-based remote access, and the remote client 152 can be configured after a user accepts an invitation, as discussed below.

The access orchestration engine 110 is responsible for providing consumer-identity-based access to remote clients (e.g., remote client 150 and remote client 152). The access orchestration engine 110 accesses an organization identifier (e.g., organization identifier 164) of an organization. The organization identifier 164 is associated with a request to configure the organization for a CIS tenant environment that provides access to remote clients of the organization based on consumer identities. The organization identifier may be a unique identifier of the organization in the cloud access management system 100A.

The access orchestration engine 110 is configured to perform a first plurality of access orchestration operations to configure the consumer-identity-supported tenant environment. The consumer-identity-supported tenant environment is configured to authorize consumer identity-based access to remote clients. The first plurality of access orchestration operations can include generating a consumer-identity-supported tenant configuration that initializes the consumer-identity-supported tenant environment; mapping a consumer identity to the consumer-identity-supported tenant environment; and assigning a license to the consumer identity for the consumer-identity-supported tenant environment. The access orchestration engine 110 communicates an indication that the organization is configured with the consumer-identity-supported tenant environment. For example, the indication is communicated to the cloud access management client 160 (e.g., an administrator client of the organization) from which the request that the organization be configured for the consumer-identity-supported tenant environment was received.

The access orchestration engine 110 is configured to process a consumer identity of a user, where the consumer identity is approved for access to a consumer-identity-supported tenant environment. The access orchestration engine 110 is configured to perform second plurality of access orchestration operations for the consumer identity. Executing the second plurality of access orchestration operations is based on remote access client resources, organization resources, and consumer identity resources. The second plurality of access orchestration operations include provisioning the remote client 150 with remote client access resources comprising a plurality of remote access services that support accessing the remote client using the consumer identity; provisioning the remote client with organization resources of the organization; and priming the remote client 150 with the consumer identity resource of the consumer identity.

The remote client 150 is provisioned with organization resources of the organization and consumer identity resources of the consumer identity such that the organization resources and the consumer identity resources are both accessible via the remote client 150. The remote client 150 is also provisioned with remote client access resources that include a plurality of remote access services that support accessing the remote client using the consumer identity. Remote client access resources can further include resources associated with the cloud computing platform that support managed desktop functionality. For example, the additional resources can support compute, storage, and networking features of the remote client 150. The remote client 150 can be marked as provisioned or deployed as a provisioned remote client.

The cloud access management client 160 and client access management client 170 are responsible for client-side functionality associated with the cloud access management system 100A. The cloud access management client 160 can be an administrator user client (e.g., a client of an administrator of the organization) and the cloud access management client 170 can be a user client (e.g., a client of an employee of the organization). The cloud access management client 160 includes an access orchestration client 162 that performs client-side access orchestration operations to support consumer-identity-based access to the remote client 150. And the cloud access management client 170 includes an access orchestration client 172 that performs client-side access orchestration operations to support consumer-identity-based access to the remote client 150. The access orchestration client 162 and access orchestration client 172 can support a plurality of different types of remote access services (e.g., remote desktop or browser client) that provide access to the remote client 150. The access orchestration client 162 and access orchestration client 172 can present different types of log in interfaces and portals that facilitate access the cloud access management system.

The access orchestration client 162 is responsible for performing administrator user client operations and the access orchestration client 172 is responsible for performing user client operations. The access orchestration client 162 communicates a license acquisition request—for example, from an administrator user client—the license acquisition request is associated with an organization requesting configuration of a CIS tenant environment for users to access the CIS tenant environment with their consumer identities. The access orchestration client 162 can be redirected from an interface associated with the license acquisition request to a CIS tenant portal. At the CIS tenant portal, the access orchestration client 162 can support communicating invitations to additional users to configure their consumer identities for access to remote clients. The access orchestration client 162 can also support signing into a remote client (e.g., remote client 150) with a consumer identity associated with a user (e.g., an administrator of the organization).

The access orchestration client 172—for example a user client—receives an invitation for a user to configure their consumer identity for access to a remote client (e.g., remote client 152). The access orchestration client 172 can communicate acceptance of the invitation such that the consumer identity is configured for access to the remote client 152. The access orchestration client 172 can be redirected from the interface associated with accepting the invitation to the CIS tenant portal.

At the CIS tenant portal, the access orchestration client 172 supports communicating the consumer identity (e.g., credentials). For example, the access orchestration client 172 can communicate encrypted credentials (e.g., username and password) of the consumer identity to the remote client to support signing the user into a CIS tenant environment and/or a user session. The access orchestration client 162 (or the access orchestration client 172) can use the consumer identity to eventually sign into the remote client 150.

The access orchestration client 162 can receive information associated with a remote client that the consumer identity has access to and communicate a selection of the remote client. The consumer identity may have access to one or more remote clients. In this way, the access orchestration client 162 can access a user selection of a remote client; and initiate a connection to the remote client; alternatively, the access orchestration engine 110 may automatically select a remote client for the user and initiate a connection to the remote client. After the remote client establishes a connection and initializes a user session via the CIS tenant environment, the access orchestration client 162 supports signing into the remote client user session.

With reference to FIG. 1B, FIG. 1B illustrates cloud access management system 100A, access orchestration engine 110 including infrastructure management engine 120, tenant directory engine 130, cloud-based services engine 140, remote client 150, remote client 152, and cloud access management client 160 with access orchestration client 162 and organization identifier 164, and client access management client 170 with access orchestration client 172.

The access orchestration engine 110 can implement the infrastructure management engine 120 to generate the CIS tenant environment based on a CIS tenant configuration. The CIS tenant configuration removes a domain requirement for the organization when configuring the CIS tenant environment. The CIS tenant environment supports mapping of consumer identities to the CIS tenant environment. The CIS tenant environment also supports discovering mappings of consumer identities to the CIS tenant environment. The access orchestration engine 110 can implement the tenant directory engine 130 that creates the CIS tenant environment, where the CIS tenant environment is registered with a tenant directory and includes a property that identifies consumer identities that are mapped to CIS tenant environment.

The infrastructure management engine 120 is responsible for server-side functionality associated with the cloud access management system. The infrastructure management engine 120 operates in the cloud access management system to perform server-side access orchestration operations to support consumer-identity-based access to the remote client 150. The infrastructure management engine 120 can receive the license acquisition request and orchestrate license acquisition operations. The infrastructure management engine 120 can cause the tenant directory engine 130 to create a CIS tenant environment in a tenant directory; and the tenant directory maps a consumer identity to the CIS tenant environment. The infrastructure management engine 120 then assigns a license to the consumer identity for the CIS tenant environment.

The infrastructure management engine 120 can also orchestrate a license assignment to a consumer identity of an additional user. In particular, an additional user may receive and accept an invitation to configure their consumer identity for access to a remote client of a CIS tenant environment. Based on communicating the acceptance of the invitation, the infrastructure management engine 150 orchestrates a license assignment including causing the tenant directory engine 130 to map the consumer identity of the additional user to the CIS tenant environment, upon which the infrastructure management engine 120 assigns a license to the consumer identity of additional user for the CIS tenant environment.

The cloud-based services engine 140 is responsible for provisioning a remote client (e.g., remote client 150 or remote client 152) for a consumer-identity-based access. The cloud-based services engine 140 listens for a license assignment (e.g., license assignment to the administrator user or the additional user). The cloud-based services engine initiates remote client provisioning operations that cause the remote client to access remote client access resources. The cloud-based services engine 140 further supports provisioning the remote client with organization resources. The cloud-based services engine 140 is responsible for determining whether a consumer identity that is associated with the license assignment is mapped to a CIS tenant environment. Upon determining that the consumer identity is mapped to a CIS tenant environment, the cloud-based services engine 140 triggers priming the remote client with consumer identity resources of the consumer identity. The cloud-based services engine 140 can deploy the remote client or mark the remote client as provisioned.

The access orchestration engine 110 can further support accessing the consumer identity of a user, where the consumer identity is licensed for access to the consumer-identity-tenant environment. Based on accessing the consumer identity, the access orchestration engine 110 initiates a discovery operation to identify the consumer-identity-supported tenant environment associated with the consumer identity. The discovery operation includes communicating with the tenant directory engine 130 to identify the consumer-identity-supported tenant environment that is mapped directly to the consumer identity of the user in the tenant directory. The access orchestration engine 110 then provides the access to the consumer-identity-supported tenant environment based on the consumer identity. For example, the access orchestration engine 110 can communicate an indication of the remote client 150 that is accessible based on the consumer identity and then signs the user in.

The access orchestration client 162 or the access orchestration client 172 is configured to communicate a consumer identity to support accessing remote client 150 and remote client 152, respectively. For example, based on consuming the consumer identity (e.g., credentials of a consumer identity) the access orchestration client 162 receives an identifier associated with the remote client, the remote client is a client that is accessible-via the consumer-identity-supported environment-using the consumer identity. The access orchestration client 162 accesses the identifier that causes initialization of a user session on the remote client 150. The access orchestration client 162 signs into the user session.

Aspects of the technical solution can be described by way of examples and with reference to FIGS. 2A-1, 2A-2 and 2B. FIGS. 2A-1, 2A-2 and 2B are block diagrams of an exemplary technical solution environment, based on example environments described with reference to FIGS. 6 and 7 for use in implementing embodiments of the technical solution are shown. Generally the technical solution environment includes a technical solution system suitable for providing the example cloud computing system 100 in which methods of the present disclosure may be employed. In particular, FIGS. 2A-1, 2A-2, and 2B show a high level architecture of the cloud computing system 100 in accordance with implementations of the present disclosure. Among other engines, managers, generators, selectors, or components not shown (collectively referred to herein as "components"), the technical solution cloud computing system 100 corresponds to FIGS. 1A and 1B.

Figures 1, 2A:
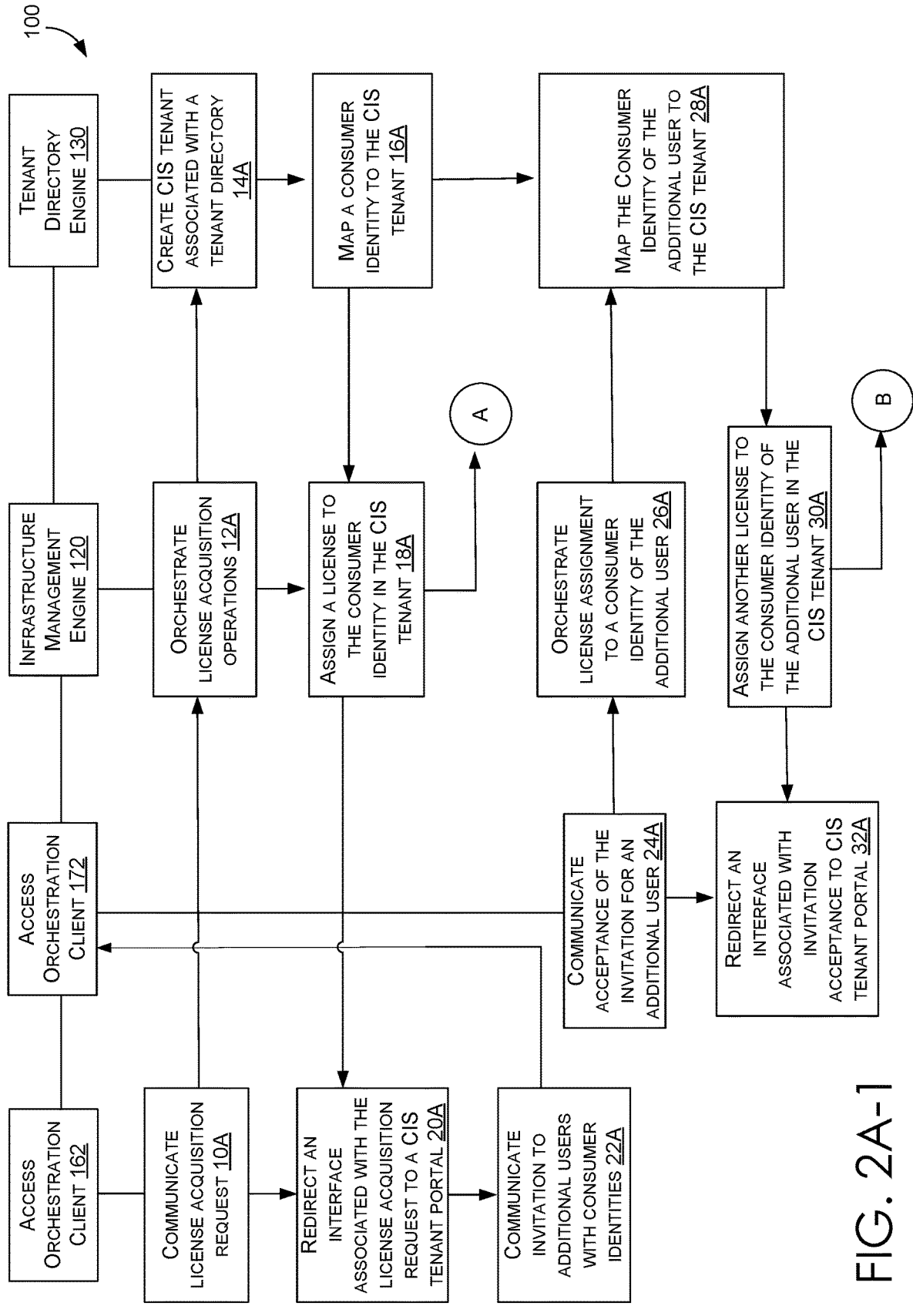
FIGS. 2A-1 and 2A-2 are block diagrams of an exemplary cloud access management system including an access orchestration engine, in accordance with aspects of the technology described herein.
Figures 2, 2A:
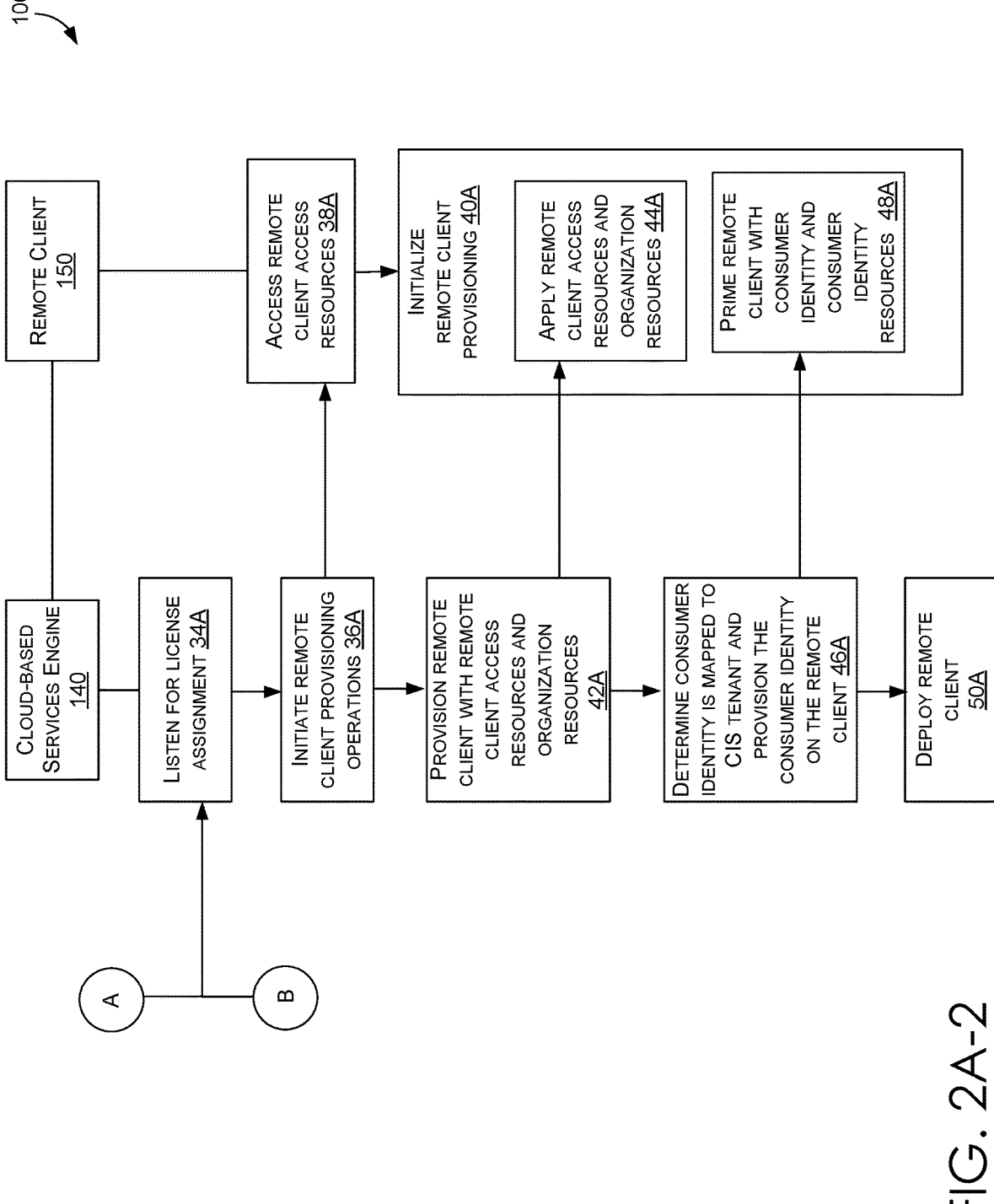

With reference to FIGS. 2A-1 and 2A-2, FIG. 2A-1 illustrates a cloud access management system 100 with infrastructure management engine 120, tenant directory engine 130, access orchestration client 162, and access orchestration client 172.

At block 10A, the access orchestration client 162 communicates a license acquisition request. At block 12A, the infrastructure management engine 120 orchestrates license acquisition operations. At block 14A, the tenant directory engine 130 creates a CIS tenant environment associated with a tenant directory; and at block 16A maps a consumer identity to the CIS tenant environment. At block 18A, the infrastructure management engine 120 assigns a license to the consumer identity in the CIS tenant environment. At block 20A, the access orchestration client 162 redirects an interface associated with the license acquisition request to a CIS tenant portal.

At block 22A, the access orchestration client 162 (e.g., an administrator client of the organization) communicates an invitation to additional users (e.g., access orchestration client 172) with consumer identities; and at block 24A the access orchestration client 172 (e.g., an employee client of a user) communicates acceptance of the invitation of an additional user. At block 26A, the infrastructure management engine 120 orchestrates license assignment to a consumer identity of the additional user. At block 28A, tenant directory engine 130 maps the consumer identity of the additional user to the CIS tenant environment. At block 30A, the infrastructure management engine 120, assigns another license to the consumer identity of the additional user in the CIS tenant environment. At block 32A, the access orchestration client 172 redirects an interface associated with the acceptance of the invitation to a CIS tenant portal.

Turning to FIG. 2A-2, FIG. 2A-2 illustrates cloud-based services engine 140 and remote client 150. At block 34A, the cloud-based services engine 140 listens for license assignments to consumer identities (e.g., license assignment A of a first user and license assignment B of a second user). At block 36A, the cloud-based services engine 140 initiates remote client provisioning operations. At block 38A, the remote client 150 provisions the remote client 150 (or remote client 152—not shown) with remote client access resources. The remote client 150 accesses resources include cloud computing provider resources that support configuring the remote client and discovering the relationship between remote client, the assignment license, the consumer identity, and the CIS tenant environment. At block 40A, the remote client 150 initializes remote client provisioning. At block 42A, the cloud-based services engine 140 provisions the remote client 150 with remote client access resources and organization resources. At block 44A, the remote 150 applies remote client access resources and organization resources. At bloc 46A, the cloud-based services engine 140 determines that a consumer identity-associated with the license assignment—is mapped to a CIS tenant environment, and provisions the consumer identity on the remote client 150. At block 48A, the remote client 150 primes the consumer identity and further primes the consumer identity resources of the consumer identity. At block 50A, the cloud-based services engine deploys the remote client 150.

Figure 2B:
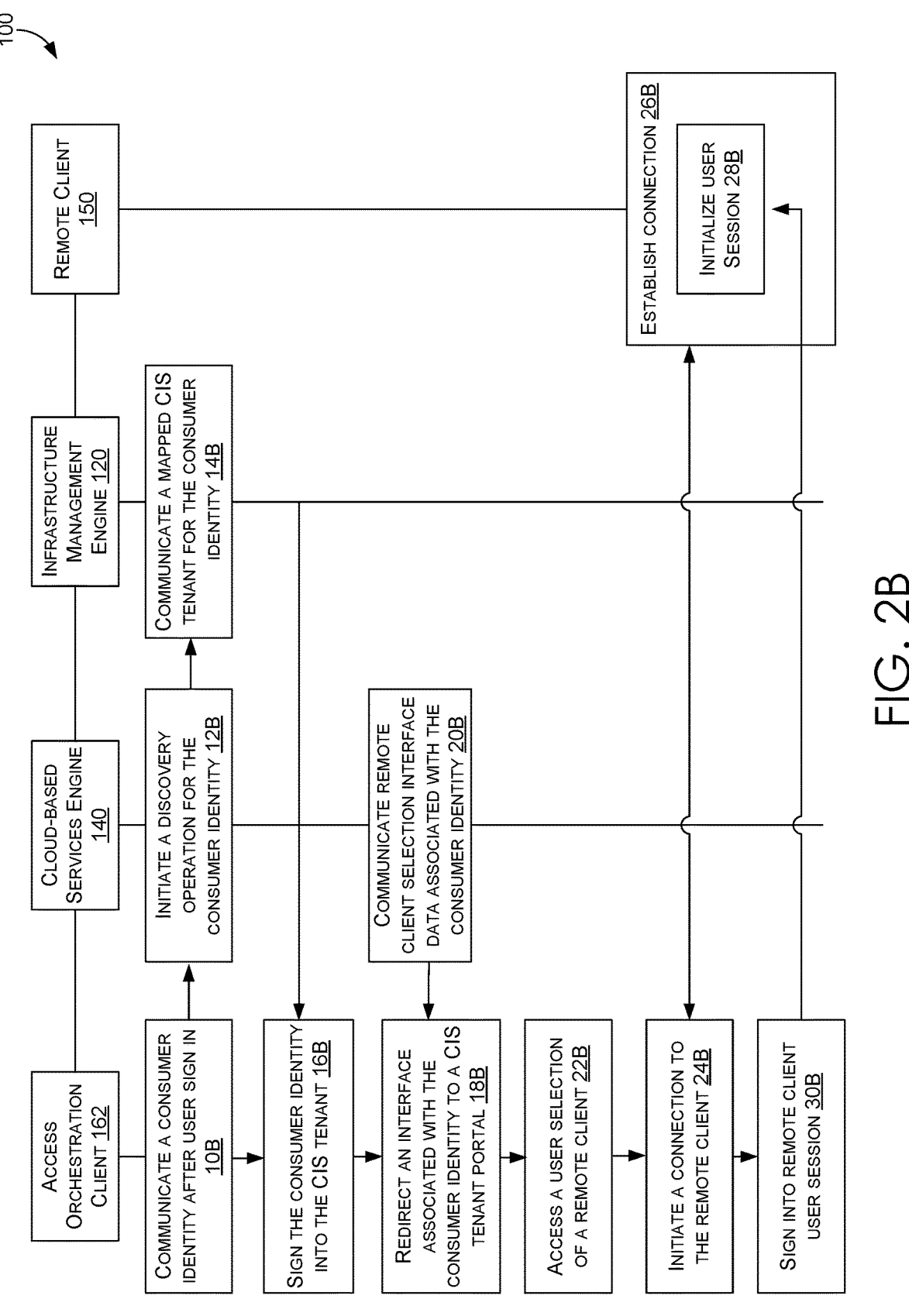
FIG. 2B is a block diagram of an exemplary cloud access management system including an access orchestration engine, in accordance with aspects of the technology described herein.

With reference to FIG. 2B, FIG. 2B illustrates a cloud computing infrastructure management engine 120, cloud-based services engine 140, and remote client 150 and access orchestration client 162 (or remote client 152 and access orchestration client 172—not shown).

At block 10B, the access orchestration client 162 communicates a consumer identity. At block 12B, the cloud-based services engine 140 initiates a discovery operation for the consumer identity. At block 14B, the infrastructure management engine 120, communicates a mapped CIS tenant environment for the consumer identity. At block 16B, the access orchestration client 162 signs the consumer identity into the CIS tenant environment; and at block 18B redirects an interface associated with the consumer identity to a CIS tenant portal. At block 20B, the cloud-based service engine 140 communicates remote client selection interface data associated with the consumer identity. At block 22B, the access orchestration client 162 communicates a user selection of a remote client (i.e., remote client 150); and at block 24B initiates a connection to the remote client 150. At block 26B, the remote client 150 establishes a connection. At block 28B, the remote client 150 initializes a user session. At block 30B, the access orchestration client 162, signs the consumer identity into the user session.

Example Methods

With reference to FIGS. 3A, 3B, 4, and 5, flow diagrams are provided illustrating methods for providing cloud access management using an access orchestration engine. The methods may be performed using the cloud access management system described herein. In embodiments, one or more computer-storage media having computer-executable or computer-useable instructions embodied thereon that, when executed, by one or more processors can cause the one or more processors to perform the methods (e.g., computer-implemented method) in the cloud access management system (e.g., a computerized system or computing system).

Turning to FIG. 3A, a flow diagram is provided that illustrates a method 300A for providing cloud access management using an access orchestration engine in a cloud access management system. At block 302A, access an organization identifier of an organization. The organization identifier is associated with a request to configured the organization for a CIS tenant environment that provides access to remote clients of the organization based on consumer identities. At block 304A, execute a plurality of access orchestration operations to configure the CIS tenant environment. The CIS tenant environment is configured to authorize consumer-identity-based access to remote clients. At block 306A, communicate an indication that the organization is configured with the CIS tenant environment. At block 308A, access a consumer identity of a user, the consumer identity is licensed for access to the CIS tenant environment. At block 310A, execute a plurality of access orchestration operations for a remote client. The plurality of access orchestration operations are executed using organization resources and consumer identity resources. At block 312A, deploy the remote client, the remote client is accessible using the consumer identity.

Turning to FIG. 3B, a flow diagram is provided that illustrates a method 300B for providing cloud access management using an access orchestration client in a cloud access management system. At block 302B, communicate a consumer identity to access the deployed remote client. Communicating the consumer identity causes creation of a user profile on the deployed remote client. The user profile corresponds to a user associated with the consumer identity. At block 304B, based on causing creation of the user profile, receive an identifier associated with the deployed remote client. At block 306B, access a user selection of the identifier associated with the deployed remote client. At block 308B, communicate the user selection of the identifier that causes initialization of a user session on the deployed remote client. At block 310B, access the user session on the deployed remote client.

Turning to FIG. 4, a flow diagram is provided that illustrates a method 400 for providing cloud access management using an access orchestration engine in a cloud access management system. At block 402, access a consumer identity of a user. The consumer identity is licensed for access to a CIS tenant environment. At block 404, initiate discovery operation to identify the CIS tenant environment associated with the consumer identity. At block 406, provide the consumer identity access to the CIS tenant environment. At block 408, communicate an indication of a remote client that is accessible based on the consumer identity. At block 410, access credentials associated with the consumer identity. At block 412, provide access to the remote client based on the credentials associated with the consumer identity.

Turning to FIG. 5, a flow diagram is provided that illustrates a method 500 for providing cloud access management using an access orchestration engine in a cloud access management system. At block 502, access an organization identifier for an organization. The organization identifier is associated with a request to configure an organization for a CIS tenant environment. The CIS tenant environment provides access to remote clients of the organization based on consumer identities. At block 504, execute a plurality of access orchestration operations to configure the CIS tenant environment. The CIS tenant environment is configured to authorized consumer-identity-based access to remote clients. Executing the plurality of access orchestration operations comprises: at block 506, generating an organization-consumer-identity tenant configuration for the CIS tenant environment; at block 508, mapping a first consumer identity to the CIS tenant environment; and at block 510, assigning a license to the first consumer identity in the CIS tenant environment. At block 512, communicate an indication that the organization is configured with the CIS tenant environment.

Technical Improvement

Advantageously, the embodiments of the present technical solution include several inventive features (e.g., operations, systems, engines, and components) associated with a cloud access management system having the access orchestration engine. Inventive features will be described with reference to operations for providing consumer-identity-based access to remote client using an access orchestration engine in a cloud access management system. Functionality of the embodiments of the present technical solution have been described, by way of an implementation and anecdotal examples, to demonstrate that the access orchestration operations are a solution to a specific problem in cloud access management to improve computing operations and interface for cloud access management systems. For example, computing resources and operations associated with organization domains, organization identities for both the organization and the cloud computing provider are no longer needed, and the user experience is improved with remote client access via a consumer identity. Overall, these improvements result in increased operational efficiencies in cloud access management systems.

Additional Support for Detailed Description

Example Distributed Computing System Environment

Figure 6:
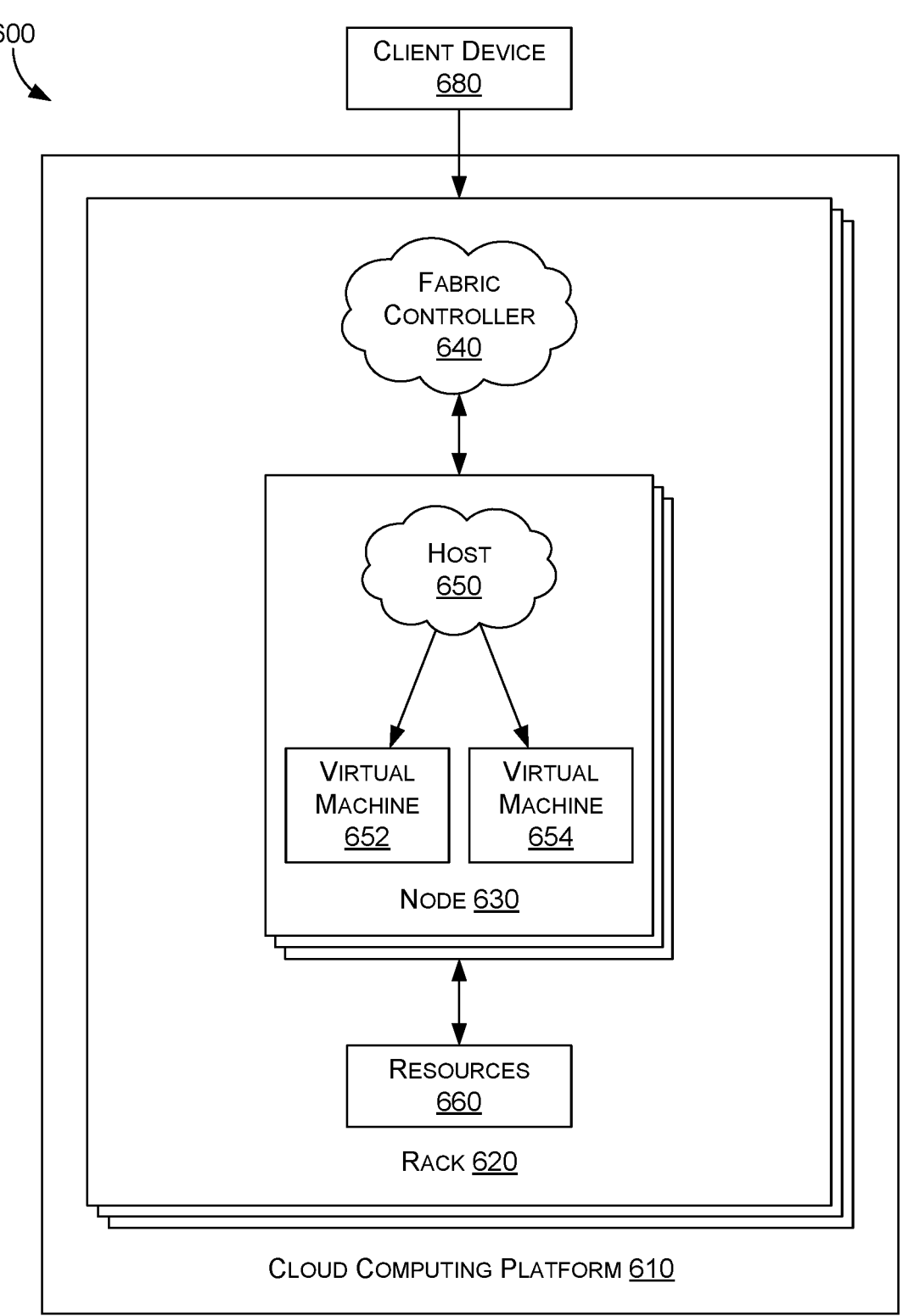
FIG. 6 provides a block diagram of an exemplary distributed computing environment suitable for use in implementing aspects of the technology described herein.

Referring now to FIG. 6, FIG. 6 illustrates an example distributed computing environment 600 in which implementations of the present disclosure may be employed. In particular, FIG. 6 shows a high level architecture of an example cloud computing platform 610 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 600 that includes cloud computing platform 610, rack 620, and node 630 (e.g., computing devices, processing units, or blades) in rack 620. The technical solution environment can be implemented with cloud computing platform 610 that runs cloud services across different data centers and geographic regions. Cloud computing platform 610 can implement fabric controller 640 component for provisioning and managing resource allocation, deployment, upgrade, and management of cloud services. Typically, cloud computing platform 610 acts to store data or run service applications in a distributed manner. Cloud computing infrastructure 610 in a data center can be configured to host and support operation of endpoints of a particular service application. Cloud computing infrastructure 610 may be a public cloud, a private cloud, or a dedicated cloud.

Node 630 can be provisioned with host 650 (e.g., operating system or runtime environment) running a defined software stack on node 630. Node 630 can also be configured to perform specialized functionality (e.g., compute nodes or storage nodes) within cloud computing platform 610. Node 630 is allocated to run one or more portions of a service application of a tenant. A tenant may be a customer utilizing resources of cloud computing platform 610. Service application components of cloud computing platform 610 that support a particular tenant can be referred to as a multi-tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 630, nodes 630 may be partitioned into virtual machines (e.g., virtual machine 652 and virtual machine 654). Physical machines can also concurrently run separate service applications. The virtual machines or physical machines can be configured as individualized computing environments that are supported by resources 660 (e.g., hardware resources and software resources) in cloud computing platform 610. It is contemplated that resources can be configured for specific service applications. Further, each service application may be divided into functional portions such that each functional portion is able to run on a separate virtual machine. In cloud computing platform 610, multiple servers may be used to run service applications and perform data storage operations in a cluster. In particular, the servers may perform data operations independently but exposed as a single device referred to as a cluster. Each server in the cluster can be implemented as a node.

Client device 680 may be linked to a service application in cloud computing platform 610. Client device 680 may be any type of computing device, which may correspond to computing device 600 described with reference to FIG. 6, for example, client device 680 can be configured to issue commands to cloud computing platform 610. In embodiments, client device 680 may communicate with service applications through a virtual Internet Protocol (IP) and load balancer or other means that direct communication requests to designated endpoints in cloud computing platform 610. The components of cloud computing platform 610 may communicate with each other over a network (not shown), which may include, without limitation, one or more local area networks (LANs) and/or wide area networks (WANs). Example Computing Environment Having briefly described an overview of embodiments of the present technical solution, an example operating environment in which embodiments of the present technical solution may be implemented is described below in order to provide a general context for various aspects of the present technical solution. Referring initially to FIG. 6 in particular, an example operating environment for implementing embodiments of the present technical solution is shown and designated generally as computing device 600. Computing device 600 is but one example of a suitable computing environment and is not intended to suggest any limitation as to the scope of use or functionality of the technical solution. Neither should computing device 700 be interpreted as having any dependency or requirement relating to any one or combination of components illustrated.

The technical solution may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The technical solution may be practiced in a variety of system configurations, including hand-held devices, consumer electronics, general-purpose computers, more specialty computing devices, etc. The technical solution may also be practiced in distributed computing environments where tasks are performed by remote-processing devices that are linked through a communications network.

Figure 7:
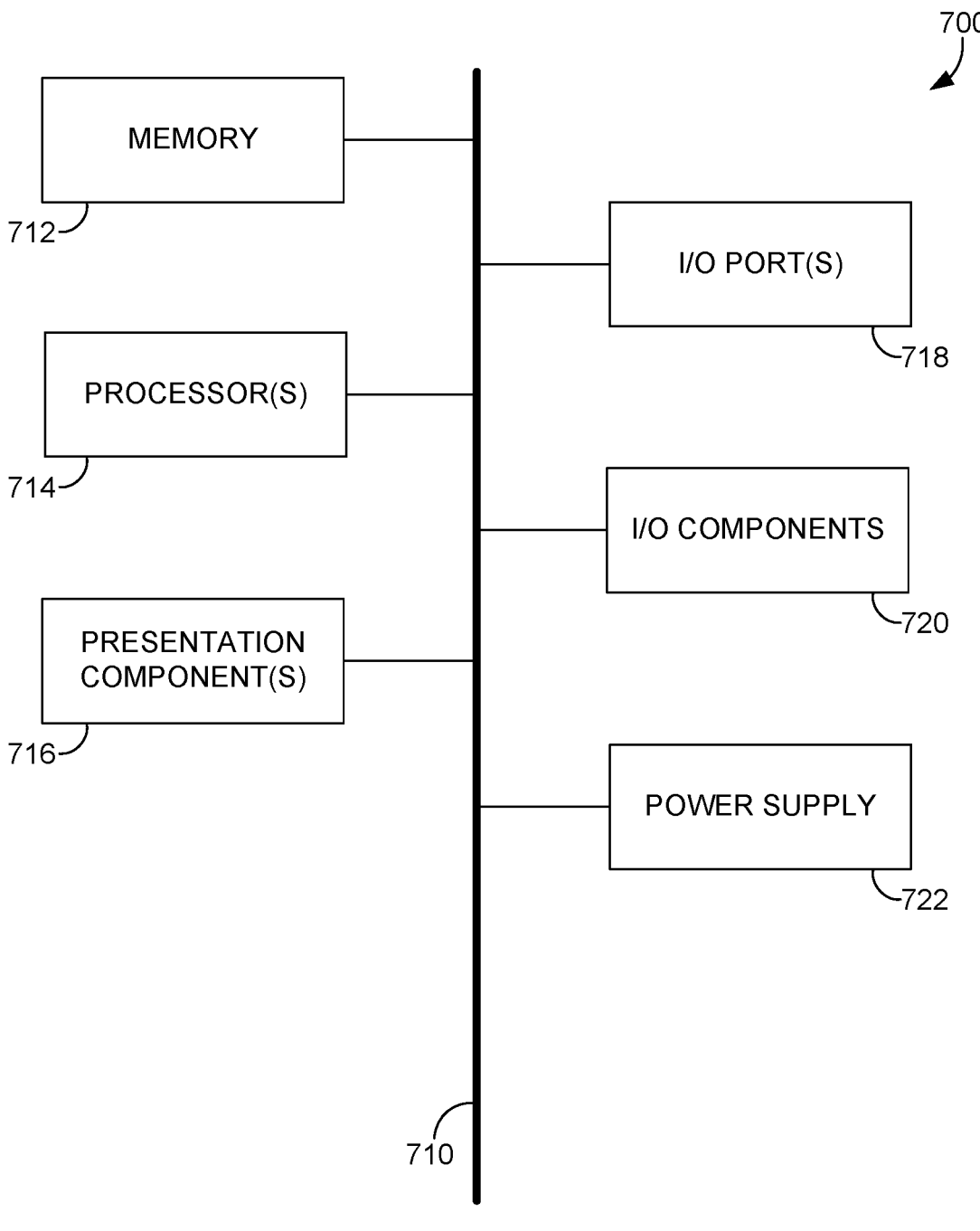
FIG. 7 is a block diagram of an exemplary computing environment suitable for use in implementing aspects of the technology described herein.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present technical solution. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the technical solution is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technical solution are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present technical solution may generally refer to the technical solution environment and the schematics described herein, it is understood that the techniques described may be extended to other implementation contexts.

Embodiments of the present technical solution have been described in relation to particular embodiments which are intended in all respects to be illustrative rather than restrictive. Alternative embodiments will become apparent to those of ordinary skill in the art to which the present technical solution pertains without departing from its scope.

From the foregoing, it will be seen that this technical solution is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system comprising:
one or more computer processors; and
computer memory storing computer-useable instructions that, when used by the one or more computer processors, cause the one or more computer processors to perform operations, the operations comprising:
accessing an organization identifier of an organization, wherein the organization identifier is associated with a request to configure the organization for a consumer-identity-supported tenant environment that provides access to remote clients of the organization based on consumer identities;

executing a first plurality of access orchestration operations to configure the consumer-identity-supported tenant environment, wherein the consumer-identity-supported tenant environment is configured to authorize consumer-identity-based access to the remote clients;

communicating an indication that the organization is configured with the consumer-identity-supported tenant environment;

accessing a consumer identity of a user, wherein the consumer identity is approved for access to the consumer-identity-supported tenant environment;

based on accessing the consumer identity, executing a second plurality of access orchestration operations for a remote client, wherein executing the second plurality of access orchestration operations are executed based on remote access client resources, organization resources and consumer identity resources; and deploying the remote client, wherein the remote client is accessible using the consumer identity.

2. The system of claim 1, wherein the consumer-identity-supported tenant environment is generated based on a consumer-identity-supported tenant configuration that removes domain requirements for the organization when configuring the consumer-identity-supported tenant environment.

3. The system of claim 1, wherein the consumer-identity-supported tenant environment supports mapping of consumer identities to the consumer-identity-supported tenant environment and discovery of mappings of consumer identities to the consumer-identity-supported tenant environment.

4. The system of claim 1, wherein the organization is associated with the organization resources and the consumer identity is associated with the consumer identity resources, the organization resources and consumer identity resources are both accessible via the remote client associated with the consumer-identity-supported tenant environment.

5. The system of claim 1, wherein the remote client access resources comprise a plurality of remote access services that support accessing the remote client using the consumer identity.

6. The system of claim 1, wherein executing the first plurality of access orchestration operations further comprises:

generating a consumer-identity-supported tenant configuration that initializes the consumer-identity-supported tenant environment;

mapping a first consumer identity to the consumer-identity-supported tenant environment; and assigning a license to the consumer identity in the consumer-identity-supported tenant environment.

7. The system of claim 1, wherein executing the second plurality of access orchestration operations further comprises:

provisioning the remote client with remote client access resources comprising a plurality of remote access services that support accessing the remote client using the consumer identity;

provisioning the remote client with the organization resources of the organization; and priming the remote client with the consumer identity resources of the consumer identity.

8. The system of claim 1, the operations further comprising:

accessing the consumer identity of the user, wherein the consumer identity is licensed for access to the consumer-identity-supported tenant environment;

20 initiating a discovery operation to identify the consumer-identity-supported tenant environment associated with the consumer identity;

based on the consumer identity, providing access to the consumer-identity-supported tenant environment;

communicating an indication of the remote client that is accessible based on the consumer identity;

accessing credentials associated with the consumer identity; and based on the credentials associated with the consumer identity, providing access to the remote client.

9. The system of claim 8, wherein the discovery operation further comprises communicating with a tenant directory to identify the consumer-identity-supported tenant environment that is mapped directly to the consumer identity of the user in the tenant directory.

10. The system of claim 1, the operations further comprising:

communicating the consumer identity from a client device to access the remote client;

based on communicating the consumer identity, receiving an identifier associated with the remote client;

accessing a user selection of the identifier that causes initialization of a user session on the remote client; and signing into the user session on the remote client.

11. One or more computer-storage media having computer-executable instructions embodied thereon that, when executed by a computing system having a processor and memory, cause the processor to perform operations, the operations comprising:

accessing an organization identifier of an organization, wherein the organization identifier is associated with a request to configure the organization for a consumer-identity-supported tenant environment that provides access to remote clients of the organization based on consumer identities;

executing a first plurality of access orchestration operations to configure the consumer-identity-supported tenant environment, wherein the consumer-identity-supported tenant environment is configured to authorize consumer-identity-based access to the remote clients;

communicating an indication that the organization is configured with the consumer-identity-supported tenant environment;

accessing a consumer identity of a user, wherein the consumer identity is approved for access to the consumer-identity-supported tenant environment;

based on accessing the consumer identity, executing a second plurality of access orchestration operations for a remote client, wherein executing the second plurality of access orchestration operations are executed based on remote access client resources, organization resources and consumer identity resources; and deploying the remote client, wherein the remote client is accessible using the consumer identity.

12. The media of claim 11, wherein the consumer-identity-supported tenant environment is generated based on a consumer-identity-supported tenant configuration that removes domain requirements for the organization when configuring the consumer-identity-supported tenant environment.

13. The media of claim 12, wherein the consumer-identity-supported tenant environment supports mapping of consumer identities to the consumer-identity-supported tenant environment and discovery of mappings of consumer identities to the consumer-identity-supported tenant environment.

14. The media of claim 11, wherein executing the first plurality of access orchestration operations further comprises:

generating a consumer-identity-supported tenant configuration that initializes the consumer-identity-supported tenant environment;

mapping a first consumer identity to the consumer-identity-supported tenant environment; and assigning a license to the consumer identity in the consumer-identity-supported tenant environment.

15. The media of claim 11, wherein executing the second plurality of access orchestration operations further comprises:

provisioning the remote client with remote client access resources comprising a plurality of remote access services that support accessing the remote client using the consumer identity;

provisioning the remote client with the organization resources of the organization; and priming the remote client with the consumer identity resources of the consumer identity.

16. A computer-implemented method, the method comprising:

accessing an organization identifier of an organization, wherein the organization identifier is associated with a request to configure the organization for a consumer-identity-supported tenant environment that provides access to remote clients of the organization based on consumer identities;

executing a first plurality of access orchestration operations to configure the consumer-identity-supported tenant environment, wherein the consumer-identity-supported tenant environment is configured to authorize consumer-identity-based access to the remote clients;

communicating an indication that the organization is configured with the consumer-identity-supported tenant environment;

accessing a consumer identity of a user, wherein the consumer identity is approved for access to the consumer-identity-supported tenant environment;

based on accessing the consumer identity, executing a second plurality of access orchestration operations for a remote client, wherein executing the second plurality of access orchestration operations are executed based on remote access client resources, organization resources and consumer identity resources; and deploying the remote client, wherein the remote client is accessible using the consumer identity.

17. The method of claim 16, wherein the consumer-identity-supported tenant environment is generated based on a consumer-identity-supported tenant configuration that removes domain requirements for the organization when configuring the consumer-identity-supported tenant environment.

18. The method of claim 16, wherein the consumer-identity-supported tenant environment supports mapping of consumer identities to the consumer-identity-supported tenant environment and discovery of mappings of consumer identities to the consumer-identity-supported tenant environment.

19. The method of claim 16, wherein executing the first plurality of access orchestration operations further comprises:

generating a consumer-identity-supported tenant configuration that initializes the consumer-identity-supported tenant environment;

mapping a first consumer identity to the consumer-identity-supported tenant environment; and assigning a license to the consumer identity in the consumer-identity-supported tenant environment.

20. The method of claim 16, wherein executing the second plurality of access orchestration operations further comprises:

provisioning the remote client with remote client access resources comprising a plurality of remote access services that support accessing the remote client using the consumer identity;

provisioning the remote client with the organization resources of the organization; and priming the remote client with the consumer identity resources of the consumer identity.

* * * * *